United States Patent [19]

Hamasaki

[11] Patent Number: 4,507,540

[45] Date of Patent: Mar. 26, 1985

[54] WELDING METHOD COMBINING LASER WELDING AND MIG WELDING

[75] Inventor: Masanobu Hamasaki, Takamatsu, Japan

[73] Assignees: Agency of Industrial Science & Technology; Ministry of International Trade & Industry, both of Tokyo, Japan

[21] Appl. No.: 475,693

[22] Filed: Mar. 15, 1983

[30] Foreign Application Priority Data

Oct. 6, 1982 [JP] Japan ................... 57-175883

[51] Int. Cl.³ .............................................. B23K 27/00
[52] U.S. Cl. .................. 219/121 LD; 219/121 LR; 219/121 LU; 219/74; 219/137.2
[58] Field of Search ................ 219/121 LC, 121 LD, 219/121 L, 121 LM, 121 LE, 121 LF, 121 LG, 121 LN, 121 LA, 121 LB, 121 LU, 121 LR, 137.2, 74

[56] References Cited

U.S. PATENT DOCUMENTS 3,165,619  1/1965  Cohen ................... 219/121 EC

FOREIGN PATENT DOCUMENTS 13123  4/1972  Japan ................... 219/121 L
187894  10/1966  U.S.S.R. ................ 219/121 L

OTHER PUBLICATIONS

Steen et al., "Arc-Augmented Laser Welding", Fourth International Conference on Advances in Welding Processes, Paper No. 17, pp. 257-265, 5/78.
Extra Power for Laser Welds from GTAW arcs, Welding Research News Welding Design and Fabrication, No. 5, Feb. 1980.

Primary Examiner—C. L. Albritton
Attorney, Agent, or Firm—Oblon, Fisher, Spivak, McClelland & Maier

[57] ABSTRACT

Welding of deep penetration is obtained in a sustrate by a method which comprises first melting the joint portion of the substrates by MIG welding and then focusing a laser beam in the bottom surface of a crater formed in consequence of the MIG welding thereby effecting laser welding of the crater.

3 Claims, 6 Drawing Figures

WELDING METHOD COMBINING LASER WELDING AND MIG WELDING

BACKGROUND OF THE INVENTION

This invention relates to a welding method which combines metal inert-gas arc welding (hereinafter referred to as "MIG welding") and laser welding.

MIG welding, as illustrated in FIG. 1, consists in generating an arc between a wire 1 and a substrate 3, with the site of welding shielded with an inert gas against possible oxidation, to melt the substrate 3 and the wire 1. The wire 1 is automatically fed to the shifting site of welding as the wire 1 gradually melts. During welding, the impulse of finely divided metal particles and the plasma stream cooperate to produce a penetration to depth $P_M$.

Welding by laser beam, as illustrated in FIG. 2, effects welding of a given substrate 3 by focusing a laser beam 4 with a lens 5 to form a focal point near the surface of the substrate 3, with the flow of a shield gas directed to the site of welding, to melt the substrate 3 and produce a penetration to depth $P_L$. When the substrate to be welded has a large thickness, the penetration at the site of welding must be given a proportionately increased depth. For the depth of this penetration to be increased solely by laser welding, the unit volume of the laser used is increased so much as to render the laser welding prohibitively expensive.

SUMMARY OF THE INVENTION

An object of this invention is to provide a welding method capable of welding a substrate of great thickness economically and at a high speed.

To accomplish this object according to the present invention, there is provided a welding method which effects welding of deep penetration on a given substrate by combining laser welding and MIG welding so as to melt the substrate at the spot of welding by MIG welding and, in the meantime, focus the laser beam to bring its focal point near the bottom surface of a crater dug in the substrate to great depth by the impulsive force of finely divided metal particles from welding and the arc plasma flow.

Alternatively, the welding of deep penetration may be accomplished by first melting the substrate at the spot of welding by the laser welding and subsequently carrying out the MIG welding at the freshly molten portion of the substrate.

As described above, this invention readily effects welding of deep penetration in a substrate of great thickness at high speed without any increase in the unit volume of the laser by combining laser welding and MIG welding and consequently taking optimum advantage of the characteristic features of the two welding methods.

The other objects and characteristic features of the present invention will become apparent from the description to be given hereinbelow in further detail with reference to the accompanying drawing.

DESCRIPTION OF PREFERRED EMBODIMENTS

Figure 3:
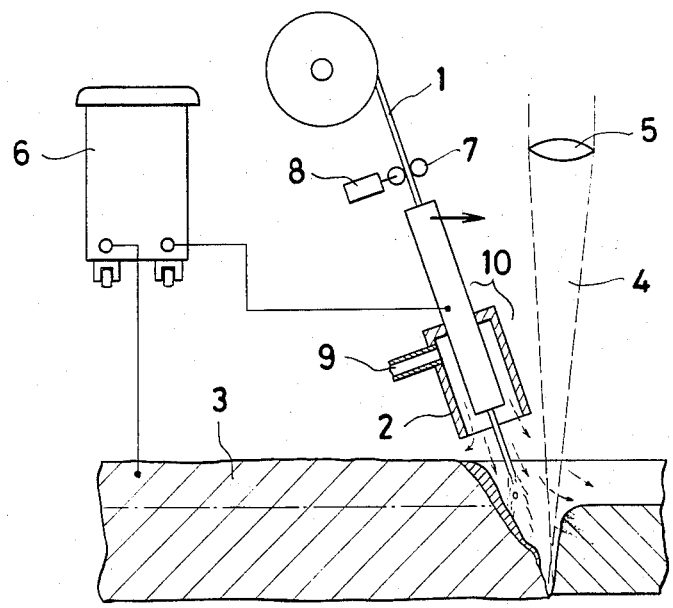
FIG. 3 is an explanatory diagram illustrating one embodiment of the welding method of this invention combining the laser welding and the MIG welding.

FIG. 3 is an explanatory diagram illustrating the welding method of this invention which combines laser welding and MIG welding. In the illustrated embodiment, the combined welding method is depicted as forming an edge penetration at the joint portion. Here it is assumed that a MIG torch 10 and a laser beam 4 issuing from a laser generator are simultaneously moved in the direction of the arrow. One terminal of a DC constant voltage arc welder unit 6 is connected to the substrate 3 and the other terminal thereof to the MIG torch 10. MIG welding is carried out by generating an arc between the wire 1 and the substrate 3 to melt the wire 1 and the substrate 3 and continuously feeding the wire 1 at a rate conforming to the speed of melting of the wire 1 by driving wire feeding pinch rollers 7 with a DC motor 8.

As the shield gas for use in the laser welding, helium gas or a mixed gas of helium and oxygen is the best choice because this gas permits welding of deep penetration to be obtained without entailing generation of plasma gas. Since MIG welding is performed in close proximity to laser welding, it is advisable to use helium gas or a mixed gas of helium and oxygen as the shield gas also for MIG welding. The use of one and the same shield gas proves to be advantageous because of economy and freedom from otherwise possible interference between two gases. Of course, carbon dioxide, a mixture of carbon dioxide with argon, a mixture of carbon dioxide with helium, or a mixture of helium with argon, for example, may be used as the shield gas for MIG welding. For the purpose of this invention, the welding which is performed by using such a gas as the shield gas will be referred to MIG welding just the same.

When laser welding and MIG welding are adopted in combination, selection of the relative positions of their sites of welding greatly affects the depth of penetration obtained. When the electric power from an arc welding unit 6 is supplied to the substrate 3 and the MIG torch 10 under the flow of a shield gas, an arc is generated between the substrate 3 and the MIG torch 10 to melt the surface of the substrate. Owing to the impulsive force produced by the impingement of molten metal particles and the force of the arc plasma stream, the substrate is melted to a great depth to give rise to what is called a crater, i.e. a penetration which remains after expulsion of the molten metal from the welded portion of the substrate. Now, the position of the MIG torch 10 must be adjusted so that the laser beam can be focused on the lowest surface of the penetration. Where the laser beam and the MIG torch are simply combined and the laser beam is caused to impinge upon the molten metal produced by MIG welding, the welding operation only serves to improve the efficiency of laser absorption and enhance the penetration of welding only slightly.

The position of the focal point of the laser beam has as great effect on the penetration of welding as the position of the MIG torch. In fact it is widely known that a slight deviation of the focal point from the exact position thereof results in a wide variation in the depth of penetration. It is, therefore, important to adjust also the height of the focal point by the manipulation of the optical system 5 in the laser beam generation unit and the protective device for the optical system so that the focal point may coincide with the bottom surface of the penetration. Normally, the penetration of welding can be maximized by focusing the laser beam near the bottom surface of the crater or penetration.

Figure 4:
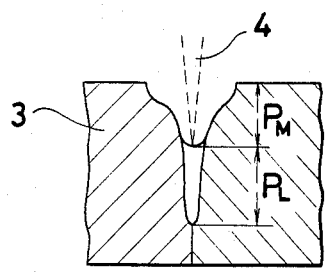
FIG. 4 is an explanatory diagram illustrating the condition of penetration obtained by the combination of laser welding and MIG welding.

Namely, this invention is directed to accomplishing a penetration of welding to a great depth by a method which comprises fixing the focal point of the laser beam near the bottom surface of the penetration (crater) produced by MIG welding as illustrated in FIG. 4 and thereby effecting addition of the depth of penetration, $P_L$, by laser welding to the depth of penetration, $P_M$, by MIG welding to obtain a total depth, $P_M$, of penetration as a whole. Although the laser beam is reflected to some extent by the surface of a solid substance, it is substantially completely absorbed in a liquid substance. The application of the laser beam to the molten portion of the substrate, therefore, is highly effective also in enhancing the efficiency of laser beam absorption. If a MIG welder using a current strength of 300 A and a laser welder using an electric power of 5 KW are adopted, for example, the price of the MIG welder is about one hundredth of the price of the laser welder. Thus, the total price of the two welders to be used is substantially equal to the price of the laser welder alone.

MIG welding melts the wire a great deal. If an edge preparation serving to increase the depth of penetration is formed along the joint portion of the substrate, therefore, that edge preparation can be filled up with the molten metal resulting from the melting of the wire. Optionally a tracer nozzle may be used for the purpose of preventing the weld beads from undergoing oxidation. In this case, the tracer nozzle may be operated with an inexpensive gas. As the gas for this purpose, carbon dioxide gas is suitable for a substrate of soft steel and nitrogen or a mixed gas of nitrogen with hydrogen is suitable for a substrate which of stainless steel.

Figure 1:
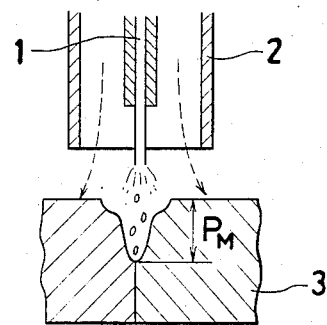
FIG. 1 is a sectioned schematic explanatory diagram illustrating MIG welding in process and the condition of penetration obtained thereby.
Figure 2:
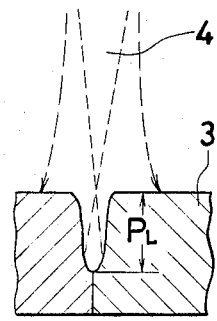
FIG. 2 is a sectioned schematic explanatory diagram illustrating laser welding in process and the condition of penetration obtained thereby.
Figure 5:
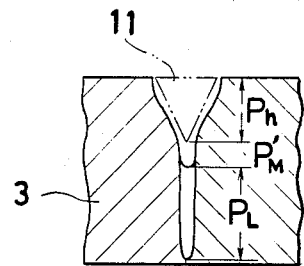
FIG. 5 is an explanatory diagram illustrating the condition of penetration obtained by the combination of laser welding and MIG welding where there is formed a groove.

Since MIG welding melts the wire 1 copiously as described above, further addition to the depth of penetration can be attained by forming an edge preparation along the joint portion of the substrate and filling up this edge preparation with the molten metal resulting from the melting of the wire 1. FIG. 5 depicts a typical application of this method to a coupling 3 which has been fabricated to incorporate therein an edge preparation. Let $P_h$ stand for the depth of the edge preparation, and the overall depth of penetration will be $P_h + P'_M + P_L$. This total represents an appreciable addition to the depth of penetration because $P_h + P'_M$ is considerably larger than $P_M$ of FIG. 1 although $P'_M$ is smaller than $P_M$.

Figure 6:
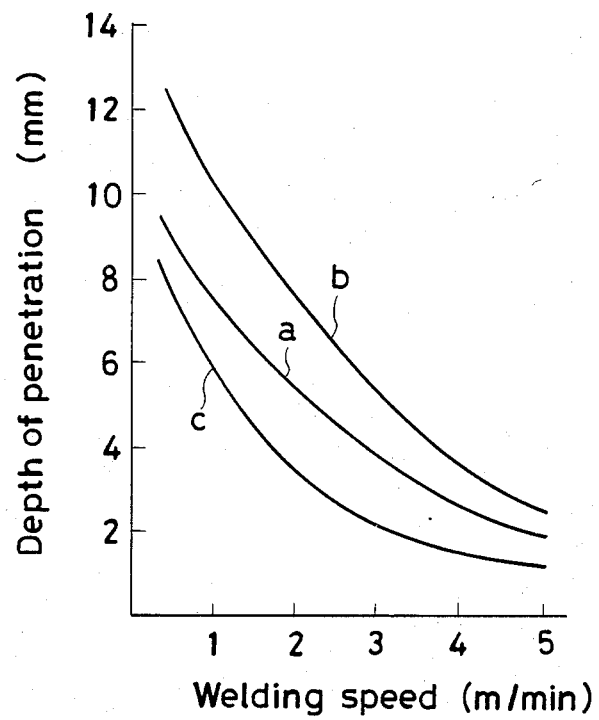
FIG. 6 is a graph showing the relation between the speed of welding and the depth of penetration obtained when a substrate of soft steel is welded.

FIG. 6 is a graph showing the relation between the welding speed and the depth of penetration as obtained when the welding is performed on soft steel. In this graph, the curve "a" represents the data obtained when laser welding using a laser welder of an electric power of 5 kW and MIG welding using a MIG welder of a current strength of 300 A were performed in combination on a substrate incorporating no edge preparation, the curve "b" the data obtained when laser welding and MIG welding by the use of the same welders as described above were performed on a substrate incorporating an edge preparation, and the curve "c" the data obtained when laser welding using a laser welder of an electric power of 5 kW was performed on a substrate. It is noted from the graph that the depth of penetration was greater when laser welding and MIG welding were performed in combination than when laser welding alone was performed. This means that addition to the depth of penetration can be attained by combining expensive laser welding with inexpensive MIG welding, although the combined use of the laser welder with the MIG welder is only about as expensive as the use of the laser welder alone. This fact implies that under a fixed set of welding conditions, the combined use of the two welders permits the welding to be obtained at a higher speed. In the illustrated embodiment, the combined use of laser welding with MIG welding has been described in detail with respect to an arrangement in which a MIG torch is set behind a laser beam generator. The same deep penetration can be obtained by another arrangement in which the MIG torch is set ahead of the laser beam generator so that the substrate is first welded by the laser beam and the molten portion of the substrate subjected subsequently to MIG welding by use of arc plasma stream. In this arrangement, the point of impingement of the laser beam and the position of the MIG torch must be properly selected so that the backward flow of the molten metal resulting from MIG welding does not interfere with the exposure of the site of welding to the laser beam. Of course in this case, the tracer nozzle must be detached from the MIG torch and disposed separately.

Where deep penetration is obtained by focusing the laser beam on the bottom surface of the crater formed by MIG welding, the relative positions of the point of impingement of the laser beam and the MIG torch must be changed whenever the speed of welding is varied or the current strength of electric power for MIG welding is varied. When one fixed welding operation is repeated, the aforementioned relative positions need not be changed once they have been properly set. When the welding is performed on small lots of articles of many types, there inevitably ensues the trouble that these relative positions should be changed whenever there is a shift from one kind of articles to another. In this case, the trouble may be precluded with a small sacrifice of the depth of penetration by fixing the distance between the point of impingement of the laser beam and the position of the MIG torch so that a coupling fabricated in advance to incorporate therein an edge preparation will be laser welded first and it will be subsequently MIG welded before the molten metal resulting from the laser welding is allowed to solidify or cool off. By this method, satisfactory welding is obtained even when the relative positions of the point of impingement of the laser beam and the MIG torch are varied appreciably.

Usually in MIG welding, the included angle of 60° is preferably selected for the coupling. This is because at a smaller included angle, poor penetration occurs in the root portion. When laser welding is performed first and MIG welding is subsequently carried out before the molten metal resulting from laser welding is allowed to solidify or, if the solidification has already started, before the molten metal is allowed to cool off, such poor penetration cannot occur because the root portion has been amply preheated. For this reason, satisfactory welding can be obtained if the included angle is not fixed at 60° but is selected in the range of 35° to 50°. Such a decrease in the included angle results in a proportionate decrease in the amount of molten metal to be used for filling the edge preparation, making it possible to increase the depth of penetration and to add to the thickness of the substrate on which the welding can be effectively performed.

In accordance with the method of this invention described above, welding of the degree attained by a laser of high output can be obtained or addition to the welding speed can be materialized by using an inexpensive welding apparatus without entailing any addition to the output of the laser or to the price of the laser. The benefit derived from this invention is very great.

What is claimed is:

1. A welding method, which comprises setting a laser beam source and a MIG welding torch thereby allowing MIG welding first to melt the joint portion of substrates and subsequently enabling the laser beam to be focused near the bottom surface of a crater dug to a great depth by the impulsive force of molten metal particles and the force of arc plasma stream to attain the welding with deep penetration.

2. A welding method combining laser welding with MIG welding, which comprises:
   interposing between the upper portions of the opposed surfaces of two substrates a groove large enough to be filled up with the molten metal resulting from MIG welding,
   adjusting the focal point of the laser beam to the root portion of said groove, and
   subjecting the molten metal formed by the laser beam at the root portion of said groove to MIG welding before said molten metal is allowed to solidify thereby obtaining deep penetration.

3. A method according to claim 2, wherein the angle of said groove is in the range of 35° to 50°.

* * * * *